United States Patent [19]
Keeler

[11] Patent Number: 5,110,041
[45] Date of Patent: May 5, 1992

[54] IN-LINE FITMENT SEALING APPARATUS AND METHOD

[75] Inventor: Donald E. Keeler, Sussex, N.J.

[73] Assignee: International Paper Company, Purchase, N.Y.

[21] Appl. No.: 572,068

[22] Filed: Aug. 24, 1990

[51] Int. Cl.⁵ .............................................. B65D 5/74
[52] U.S. Cl. ...................... 229/125.15; 220/265; 222/541; 222/545; 222/562; 229/125.14
[58] Field of Search ............... 229/125.09, 125.14, 229/125.15; 220/265, 266, 375; 222/501, 541, 543, 545, 546, 556, 557, 562; 215/356

[56] References Cited

U.S. PATENT DOCUMENTS

| | | | |
|---|---|---|---|
| 2,400,716 | 5/1946 | Sattler | 229/125.15 |
| 3,292,828 | 12/1966 | Stuart | 222/485 |
| 3,339,788 | 9/1967 | Lipske | 220/53 |
| 3,671,356 | 6/1972 | Keinanen | 156/309 |
| 3,812,572 | 5/1974 | Weikert | 29/208 B |
| 3,883,034 | 5/1975 | Rausing | 220/268 |
| 3,990,615 | 11/1976 | Kerwin et al. | 222/541 |
| 4,029,033 | 6/1977 | Kerwin et al. | 113/121 C |
| 4,246,062 | 1/1981 | Christine | 156/498 |
| 4,256,526 | 3/1981 | McDaniel | 156/295 |
| 4,363,420 | 12/1982 | Andrews | 220/307 |
| 4,373,978 | 2/1983 | Patterson | 156/69 |
| 4,464,154 | 8/1984 | Ljungcrantz | 493/87 |
| 4,512,136 | 4/1985 | Christine et al. | 53/410 |
| 4,669,627 | 6/1987 | Ueda et al. | 426/115 |
| 4,669,640 | 6/1987 | Ando et al. | 220/266 |
| 4,705,197 | 11/1987 | Gordon et al. | 206/604 |
| 4,770,325 | 9/1988 | Gordon et al. | 222/481 |
| 4,782,996 | 11/1988 | Spahni, Jr. | 229/125.09 |
| 4,788,811 | 12/1988 | Kawajiri et al. | 53/426 |
| 4,813,578 | 3/1989 | Gordon et al. | 222/541 |
| 4,830,273 | 5/1989 | Kalberer et al. | 220/265 |
| 4,846,915 | 7/1989 | Keeler | 156/261 |
| 4,909,434 | 3/1990 | Jones et al. | 229/125.15 |
| 4,948,015 | 8/1990 | Kawajiri et al. | 222/541 |
| 4,964,562 | 10/1990 | Gordon | 229/125.15 |
| 4,990,200 | 2/1991 | Heinz | 229/125.09 |

*Primary Examiner*—Gary E. Elkins
*Attorney, Agent, or Firm*—Walt T. Zielinski; Michael J. Doyle

[57] ABSTRACT

Dual lanes of fitment-sealing apparatus, for sealing plastic spout fitments to carton blanks, are integrated in line with conventional form/fill/seal production lines. Each apparatus includes a carton blank supply, an indexing conveyor for advancing the blanks in tube form to a sealing station, a gravity-feed track for supplying fitments to the sealing station through an escapement, a pair of fitment retaining clamps for holding the fitment in registration with a spout hole cut in the carton blank, an anvil which is inserted inside the carton blank, a sealing head which is moved to press the fitment in contact with and to seal it to an extrusion layer on the external side of the carton blank, and a timing control for synchronizing the movements of the parts and advancing the carton blanks through the sealing station to an output thereof. The fitment may also be sealed to the extrusion layer with a hot-melt adhesive applied to the fitment just prior to pressing against the carton blank. Heat may be applied to tackify the adhesive by a hot anvil or sealing head equipped with heating elements.

1 Claim, 4 Drawing Sheets

IN-LINE FITMENT SEALING APPARATUS AND METHOD

TECHNICAL FIELD

This invention generally relates to apparatus and method for sealing fitments to paperboard cartons, and, more particularly, of the type which can be used for operation in line with conventional carton form/fill/seal machinery.

BACKGROUND ART

Conventional paperboard cartons for packaging milk, juice, and other beverage products are typically formed from a paperboard blank assembled in a rectangular open-ended configuration, which is then filled with the liquid contents and sealed with a gable or flat-folded top. The carton forming, filling, and sealing is done under sanitary conditions in lines of so-called "form-/fill/seal" machinery. The industry has developed reclosable spouts for such cartons, typically in the form of plastic spout fitments which are sealed to the top end of the cartons. Examples of hinged-type spout fitments are shown in commonly-owned U.S. Pat. Nos. 4,705,197 and 4,770,325, both to Gordon and Kalberer. Other types of spout fitments include pull-open nozzles and screw caps. These reclosable spouts allow the cartons to be more easily opened and reclosed without leaking.

The plastic spout fitments are typically attached to the paperboard blanks by sealing a flange portion of the fitment to a heat-sealable coating or extrusion layer on the paperboard, by means of adhesives, heat sealing, or sealing with an ultrasonic horn. The attachment step requires an intermittent certain dwell time for aligning each fitment in position on a carton and applying the required adhesive, heat, or ultrasonic energy to the portion to be sealed. An example of indexing machinery for precise registration and sealing of fitments to cartons is shown in commonly-owned U.S. Pat. No. 4,846,915 of Keeler, Bombolevich and Sinocchi.

As reclosable spout fitments have come into widespread use, recent developments have been made in fitment sealing apparatus which synchronize the intermittent fitment sealing step with a continuous conveyor line used to supply cartons to form/fill/seal machinery. Examples of such fitment sealing apparatus are shown in copending, commonly-owned U.S. patent applications Ser. No. 07/594,536 of Keeler and Bombolevich, entitled "Apparatus For Continuous Feeding And Synchronized Application of Fitments To Carton Blanks And Related Method", and Ser. No. 07/571,811 of Keeler, entitled "System For Continuous High Speed Application of Fitments To Carton Blanks And Related Method", both of which are incorporated herein by reference. In these examples, the fitments are formed with a flat shape and are supplied to the fitment sealing station from a web or roll.

It is also desirable to apply three-dimensionally shaped spouts, e.g. plastic pull-open nozzles or screw caps, to the cartons at high speed in order to supply a continuous line of fitted cartons to a form/fill/seal machine. One proposal for such an apparatus is shown in U.S. Pat. No. 4,788,811 of Kawajiri, Honda and Furukawa. The Kawajiri et al. sealing apparatus includes a suction holder which retrieves a three-dimensional cap fitment from the end of a supply chute, moves the fitment axially inside a carton blank assembled in rectangular tube configuration, inserts the spout portion of the fitment laterally through a hole die-cut in the carton wall, and holds the flange portion of the fitment against the heat-sealable coating on the internal side of the carton while an ultrasonic horn is advanced on the external side. This apparatus, however, has the problem that the complex movements required of the cap holder limit the speed at which the machinery can be operated, and, further, has a significant risk of mechanical breakdown or misalignment of the fitment.

SUMMARY OF INVENTION

It is therefore a principal object of the invention to provide an apparatus and method for sealing plastic spout fitments to paperboard blanks in a continuous mode of operation, i.e., for supplying a continuous line of fitted cartons to a form/fill/seal machine. It is a particular object that such apparatus and method be capable of applying three-dimensional cap fitments on cartons with a high degree of precision and efficiency. It is a further object that such apparatus be constructed so that the moving elements thereof execute limited mechanical movements and/or functions, in order to assure a high degree of reliability and reduce the risk of mechanical failure.

In accordance with the invention, a fitment sealing apparatus comprises: carton supply means for supplying a series of carton blanks, each having a wall defining at least an open top end thereof, a spout hole cut through the carton wall at a selected spout position in the vicinity of the open top end, and an extrusion layer applied on at least an external side of the carton wall around the spout hole; advancing means for intermittently advancing each one of the series of carton blanks in turn to a sealing station; fitment supply means for supplying a series of fitments to said sealing station; escapement means for intermittently releasing each fitment in turn from said fitment supply means; fitment retaining means for receiving each fitment released from said escapement means and for positioning it in registration with the spout hole on the external side of the wall of a carton blank advanced to said sealing station; anvil means movable into the open top end adjacent the spout position on an internal side of the wall of a carton at said sealing station; anvil moving means for intermittently moving and retracting said anvil means into and from the open top end of a carton blank advanced to said sealing station; sealing means movable for pressing a fitment positioned by said fitment retaining means in contact with the extrusion layer on the external side of the wall of a carton blank at said sealing station, and also indirectly against said anvil means on the internal side thereof, and for sealing the fitment to the carton blank in registration with the spout hole; sealing moving means for intermittently moving and retracting said sealing means to and from the carton blank in timed relation with said anvil moving means; releasing means for allowing the fitment to be released from said fitment retaining means in conjunction with movement of said sealing means to press and seal the fitment to a carton blank at said sealing station; and output means for advancing each carton blank fitted with a respective fitment from said sealing station to an output end of the apparatus. The invention includes the related method and product of performing the fitment sealing.

In a preferred embodiment, a pair of fitment sealing stations are provided in a dual-lane system each operated at a speed of 60 sealing operations per minute.

Pre-sided carton blanks are opened in a tube configuration and placed in flight pockets on an indexing conveyor by a reciprocating placer for step-wise transport to each fitment sealing station. At the sealing station, a three-dimensional cap fitment is gravity-fed down a conveyor track and released by an escapement to a pair of fitment retaining clamps positioned in front of the spout hole of a carton blank advanced to the sealing station. A timing control causes the retaining clamps to move apart at the same time as an ultrasonic sealing horn advances to press the fitment in contact with the external extrusion layer on the carton blank and an anvil is inserted on the inside of the carton blank.

The horn is energized to seal the fitment to the carton blank, the horn and anvil are then retracted, and the retaining clamps are moved back in position to receive the next fitment. The semi-finished carton blank is then advanced to an output from the sealing station, where it can then be supplied to a bottom-forming index wheel and a continuous content-filling and top-sealing production line. In an alternative embodiment, the fitment is sealed to the extrusion layer with a hot-melt adhesive. The adhesive is applied to the sealing surface of the fitment just prior to pressing the fitment surface against the carton substrate. Heat may be applied to tackify the adhesive by a hot anvil or sealing head equipped with heating elements.

Other objects, features, and advantages of the present invention will become apparent from the following detailed description of the best mode of practicing the invention when considered with reference to the drawings, of which:

DETAILED DESCRIPTION OF INVENTION

Figure 1:
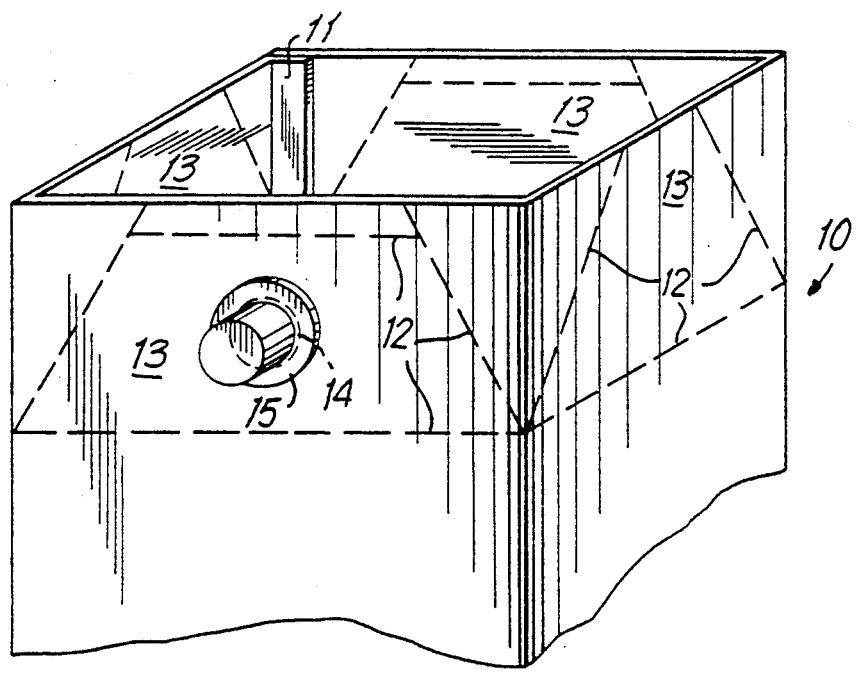
FIG. 1 is a drawing of a three-dimensional screw cap fitment sealed to the upper wall of a carton blank used for a gable top container.
Figure 2:
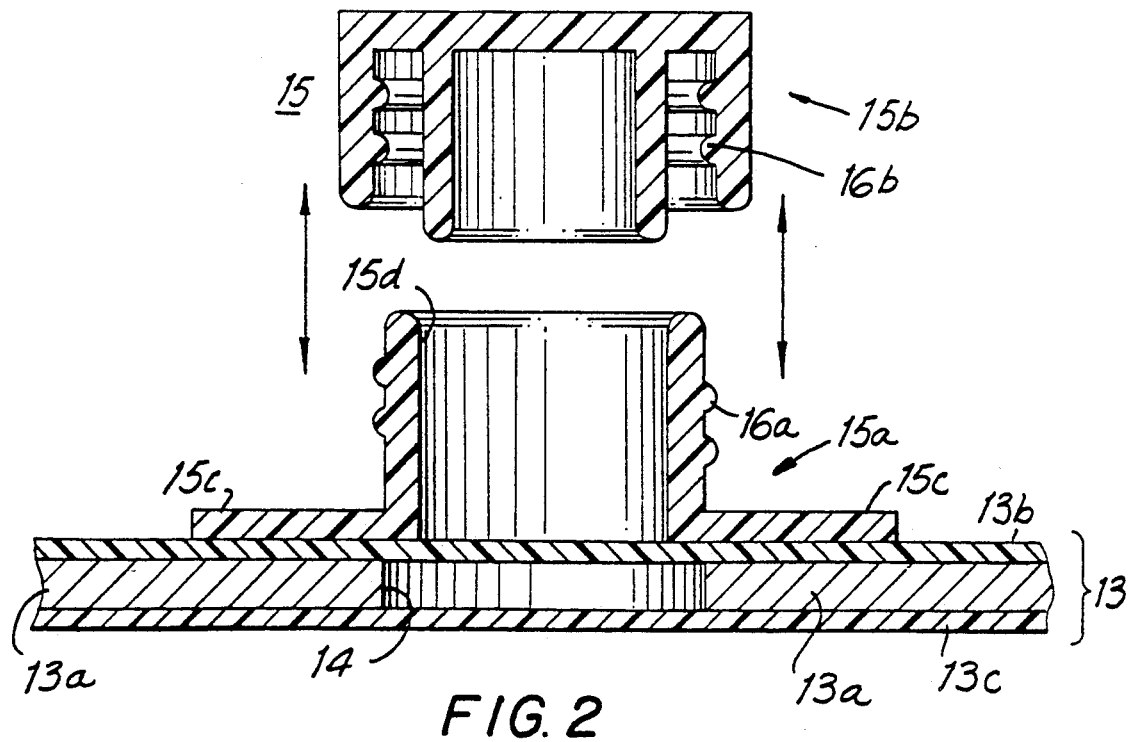
FIG. 2 is a sectional side view illustrating the sealing construction of the screw cap to the carton wall.

Referring to FIGS. 1 and 2, a spout fitment 15 is shown sealed to a carton blank 10 for use as a gable top container. In FIG. 1, the carton blank 10 is scored and formed into a hollow rectangular tube configuration in a conventional manner. The carton blank 10 is held by a seam 11 formed by sealing an edge flap of one lateral wall to the adjacent lateral wall. The upper walls of the carton blank 10 define an open top end of the carton and are shown with score lines 12 along which the upper walls 13 will later be folded to form a gable top. Alternatively, the top end may be folded down in a flat configuration to form a flat container top. One of the upper walls 13 has a spout hole 14 die-cut through the paperboard layer, and the spout fitment 15 is sealed to the carton wall in registration with the spout hole to allow the liquid contents of the container to be poured therethrough.

The spout fitment may be of any type, although the advantages of the fitment sealing capabilities of the invention are best illustrated with a fitment having a three-dimensional shape, such as a pull-open nozzle or screw cap type of spout. As shown illustratively in FIG. 2, a screw cap fitment is made of a plastic material by injection molding. The screw cap has a flange/base part 15a, and a cap part 15b which screws on and off the flange/base part 15a by means of complementary threads 16a, 16b. The carton wall 13 includes a substrate layer 13a, and extrusion layers 13b, 13c of a thermoplastic resin material on the external and internal surfaces of the carton wall. In the preferred mode of the invention, the flange portion 15c of the flange/base part 15a is sealed to the external extrusion layer 13b of the carton wall with the pour hole 15d of the cap fitment 15 aligned in registration with the spout hole 14.

Preferably, the spout hole 14 is die cut through the substrate layer 13a, then the extrusion layers 13b, 13c are applied on both sides over the spout hole. This approach seals the hole and allows the hermetic conditions of the container to be maintained during and after the form/fill/seal production process and for distribution and stocking of the product containers. The extrusion layers also serve as a tamper-proof measure for consumer safety. The spout hole is opened by the consumer, e.g., by piercing through the extrusion layers with a straw.

The carton blank may be of any type used for hermetically-sealed drink containers and for various sizes, such as pint, quart, one-liter, half-gallon, and two-liter containers. The advantages of the fitment sealing apparatus of the invention are best illustrated for paperboard containers of the type used in a continuous conveyor line to a carton form/fill/seal machine, as described for the preferred embodiment herein.

Figure 3:
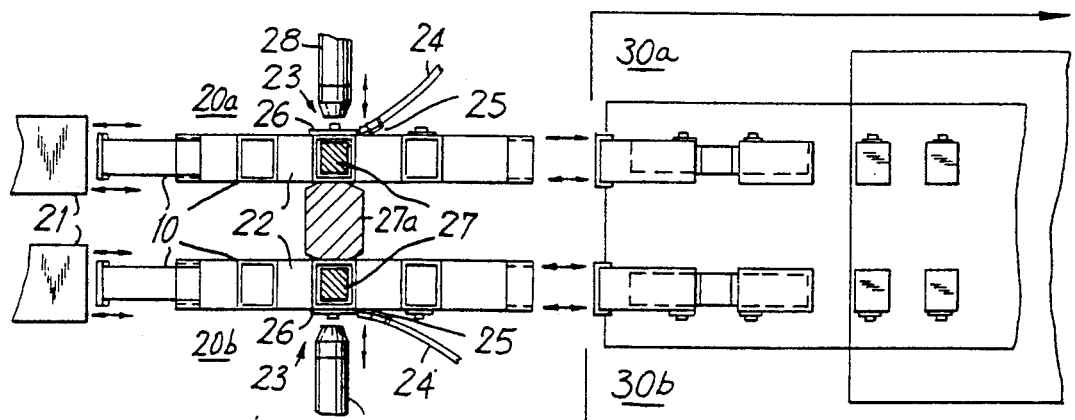
FIG. 3 is a plan view of dual fitment sealing stations for the screw cap fitments, in accordance with the invention, in line with respective form/fill/seal production lines.

In FIG. 3, dual fitment sealing lines 20a, 20b are shown in line with respective form/fill/seal production lines 30a, 30b. The form/fill/seal lines preferably operate in the range of 40 to 60 sealing operations per minute. The lines each require a continuous input of cartons from the respective sealing lines ready to be formed with a bottom end, filled with liquid contents, and sealed at the top end. Each of the fitment sealing lines 20a, 20b includes: a carton supply 21 for supplying a series of carton blanks 10 in rectangular tube form, each having the spout hole cut through the carton wall at a selected spout position in the vicinity of the open top end; an indexing conveyor 22 for intermittently advancing the carton blanks in turn to a sealing station 23; a fitment supply track 24 for supplying a series of fitments to the sealing station 23 through an escapement gate 25; a fitment retaining mechanism 26 for receiving the fitment released from the escapement gate and positioning it in registration with the spout hole in the carton blank at the sealing station 23; an anvil 27 movable into the open top end inside the carton adjacent the spout hole position; and a sealing head 28 which is moved to press the fitment in contact with the extrusion layer on the carton wall and against the anvil 27 inside the carton blank. A further support member 27a may be provided between the sealing stations of the two lines to absorb the offsetting impacts of the sealing heads 28. From the sealing station 23, the carton fitted with the spout fitment is advanced by the indexing conveyor 22 to an output end where the carton blanks are transferred to the form/fill/seal line.

Figure 4A:
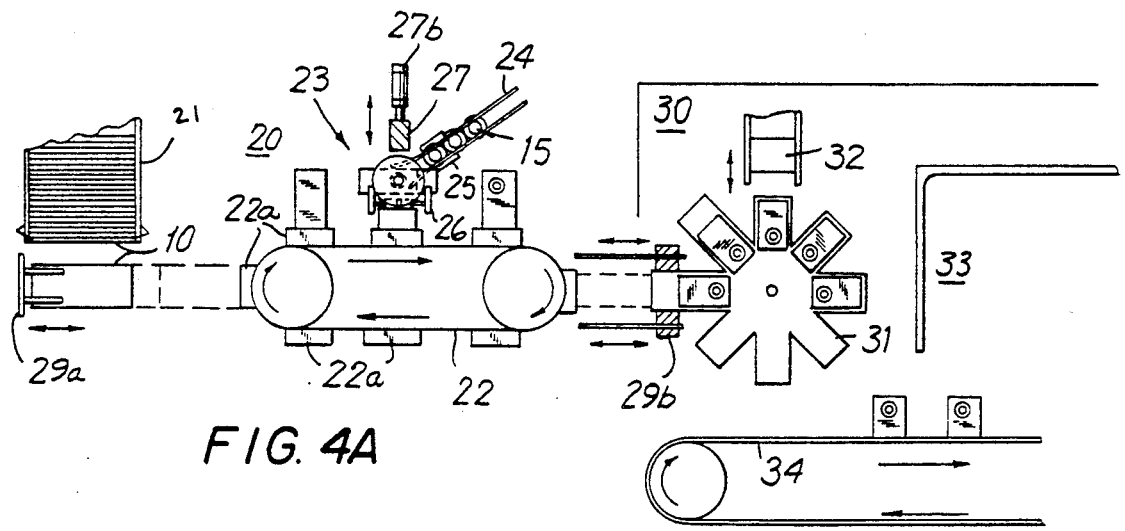
FIG. 4A is a side schematic view of the fitment sealing apparatus of the invention.
Figure 4B:
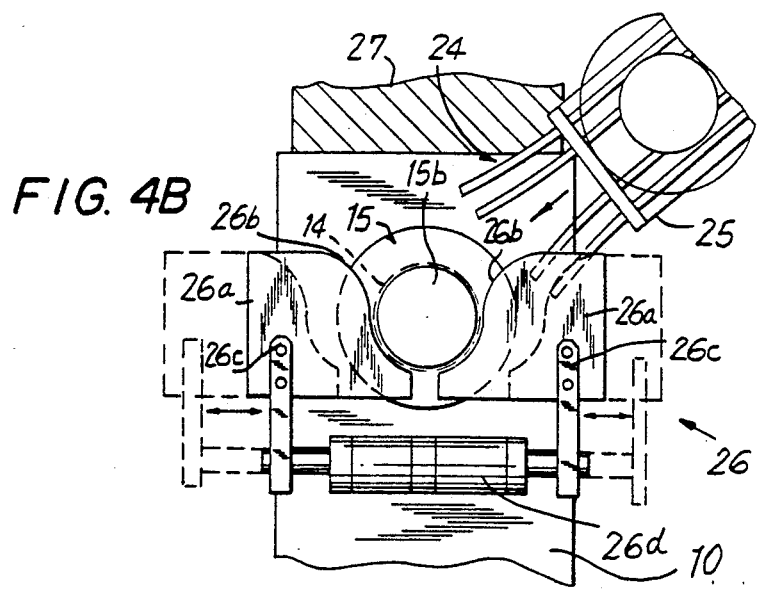
FIG. 4B is a front view detail of the fitment retaining mechanism for positioning the screw cap fitment relative to the carton blank prior to sealing.

In FIGS. 4A and 4B, the preferred embodiment is shown in greater detail. Pre-seamed carton blanks 10 are supplied from the carton supply 21. The carton blanks are opened to form a hollow tube and moved to the indexing conveyor 22 by a reciprocating placer 29a. The indexing conveyor 22 has a number of carton-holding pockets 22a supported thereon which are advanced in step-wise fashion to receive carton blanks 10 from the reciprocating placer 29a, hold the carton blanks at the sealing station 23, and advance the semi-finished carton blanks to the output end.

From the output end, a reciprocating placer 29b transfers the semi-finished carton blanks onto the spokes of an indexing wheel 31 on which the bottom ends are formed and sealed by bottom-forming member 32. The cartons are transferred from the indexing wheel 31 to a continuous line conveyor 34 on which they are moved through a liquid-filling and top-end sealing station 33. The general construction and operation of the form/fill-/seal machine for high-speed production of liquid-container products are well known in the industry and are not described further herein.

At the sealing station 23, a three-dimensional spout cap fitment 15 is gravity-fed down the feed track 24 and released by the escapement gate 25 to a pair of fitment retaining clamps 26a positioned in front of the spout hole 14 of the carton blank 10 advanced to the sealing station 23. The retaining clamps 26a have a bevelled surface 26b along which the fitment cap portion 15b slides down to the precise position in front of the spout hole 14. The retaining clamps 26a are held by brackets 26c to the ends of pistons driven by a cylinder 26d. A timing control actuates the cylinder 26d to cause the retaining clamps 26a to move apart to a position clear of the fitment, at the same time as the sealing head 28 advances to press the fitment in contact with the external extrusion layer on the carton blank and the anvil 27 is inserted inside the carton blank 10. The sealing head 28 and/or anvil 27 is energized by the timing control to seal the fitment 15 to the carton blank 10, the sealing head 28 and anvil 27 are then retracted, and the retaining clamps 26a are moved back in position to receive the next fitment.

Figure 5:
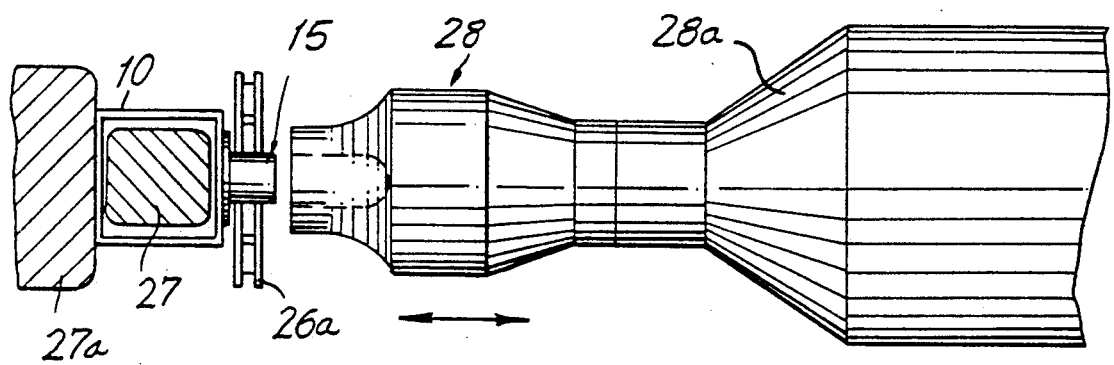
FIG. 5 is a plan view of the fitment retaining mechanism, back-up anvil, and ultrasonic sealing horn.
Figure 6:
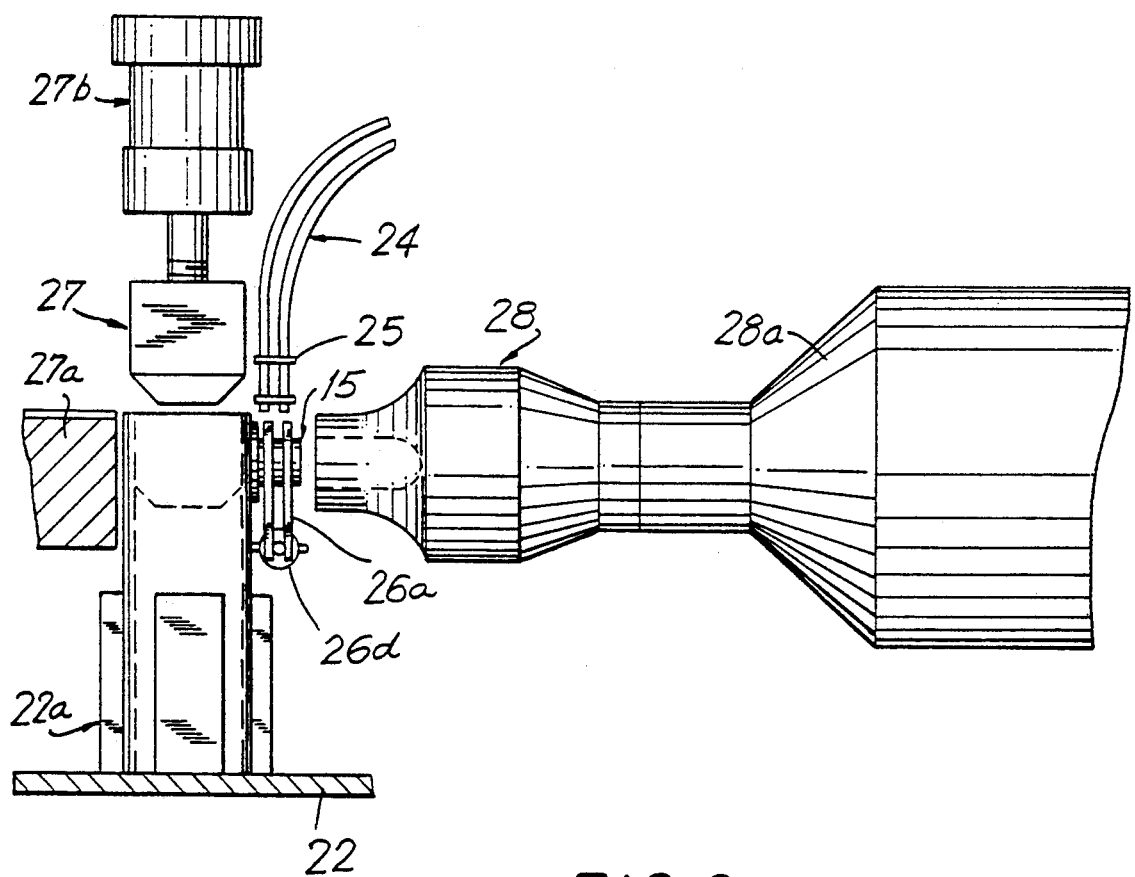
FIG. 6 is a side sectional view of the fitment retaining mechanism, back-up anvil, and ultrasonic sealing horn.

The relative positions of the fitment-handling parts are shown more clearly in FIGS. 5 and 6. The anvil 27 is inserted in the open top end of the carton blank 10 in line between the support member 27a and the movement of the sealing head 28 against fitment 15. The anvil 27 has a shape corresponding approximately to the internal confines of the carton blank with rounded edges to avoid catching on the carton. In the preferred mode, the sealing head is an ultrasonic horn which radiates short-range ultrasound energy to heat and fuse the flange portion of the fitment 15 to the external extrusion layer of the carton blank. The ultrasonic horn is advanced and retracted under timing control of its driving cylinder 28a. Similarly, the anvil 27 is inserted and retracted under timing control of its driving cylinder 27b. The anvil may also have heating elements which are energized to apply heat to the extrusion layer through the carton wall.

Figure 7:
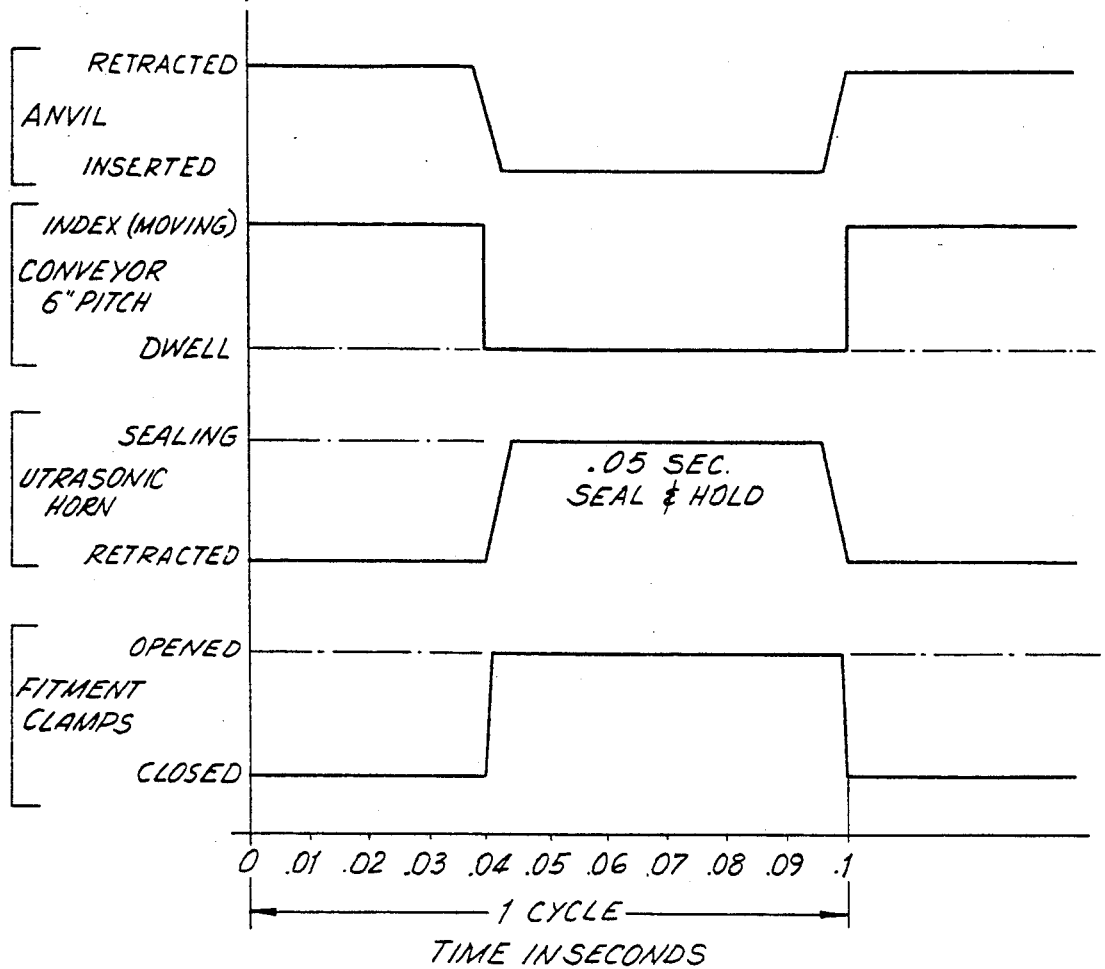
FIG. 7 is a timing chart showing the timing relationships of the fitment retaining clamps, ultrasonic sealing horn, sealing station conveyor, and back-up anvil.

In FIG. 7, an example of the timing control is illustrated for the anvil 27, indexing conveyor 22, ultrasonic horn 28, and fitment retaining clamps 26a. One complete cycle for a carton blank takes 0.1 second. During the first 0.04 second of the cycle, the indexing conveyor is moving, while the anvil and horn are retracted and the fitment clamps are in the closed (holding) position. During the latter 0.6 second of the cycle, the indexing conveyor is halted in a dwell state, the anvil is inserted, the horn is advanced to the sealing position and energized, and the fitment clamps are simultaneously moved to the opened position. With this example, semi-finished cartons blanks are output from the sealing station at the rate of 60 per minute, which is sufficient to allow it to be synchronized with a conventional form/fill/seal production line.

Figure 8:
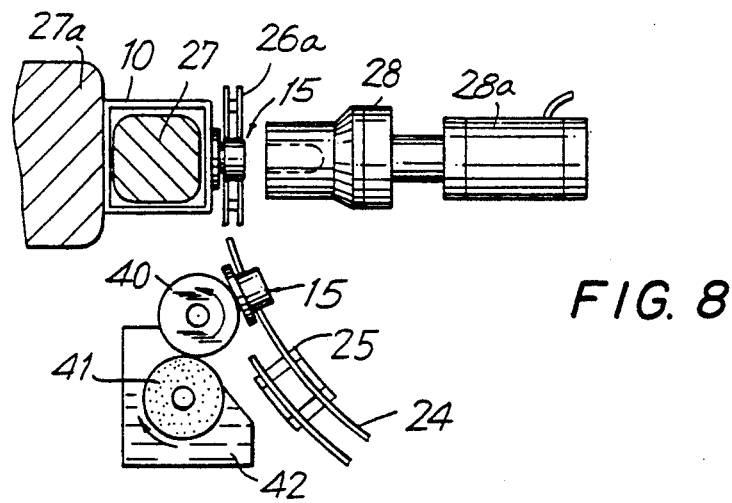
FIG. 8 is a schematic view of an alternate embodiment in which the spout fitment is sealed with hot-melt adhesive.

In FIG. 8, an alternative embodiment is shown in which the fitment 15 is sealed to the extrusion layer of the carton blank 10 with a hot-melt adhesive. As the fitment is gravity-fed from the track 24 through the escapement gate 25, the sealing surface on the rear of the flange portion of the fitment 15 is nipped and brushed with hot-melt adhesive by the applicator roll 40. The applicator roll is supplied with adhesive in a liquid state by the supply roll 41 housed in a reservoir housing 42. Alternatively, the adhesive may be applied to the carton blank by electronically actutated jet nozzles in a pattern corresponding to the shape of the spout hole and the fitment sealing surface.

The adhesive is applied to the sealing surface of the fitment just prior to its entry in the retaining clamps in position in front of the spout hole of the carton blank. The sealing head 28 is then advanced to bond the fitment to the extrusion layer of the carton blank through the adhesive layer applied by the applicator roll 40. Heat may also be applied to tackify the adhesive by a hot anvil or sealing head equipped with heating elements. A heat controller and sensors are used to maintain the proper temperature settings during production.

In accordance with the invention, the sealing of spout fitments to the carton blanks can be achieved at a rate of 60 units/minute or higher, and dual lanes can be arranged side-by-side using a common support for the movement of the sealing heads from opposite sides thereof. The moving elements at the sealing station execute simple mechanical movements so as not to limit an increase in production speed or present a risk of mechanical failure. Accurate registration of the fitment to the die-cut spout hole in the carton is obtained, and a secure seal can be formed with a low error rate. The fitment sealing system is simple in design and can be assembled at a low cost. Most importantly, the output of the sealing station can be synchronized with the input of a conventional form/fill/seal production line for the supply of spout-fitted carton blanks with a minimum of retrofitting. The ultrasonic sealing of the thermoplastic fitment flange to the heat-sealable extrusion layer, or alternatively the heat-bonding of the same through a hot-melt adhesive layer ensures a fitment seal of complete integrity and reliability.

Numerous modifications and variations are of course possible given the above disclosure of the principles and mode of carrying out the invention. It is intended that all such modifications and variations be considered as within the spirit and scope of the invention, as defined in the following claims.

I claim:

1. A carton with a pour spout for a fluid contained therein, comprising:

a carton blank having walls seamed on one side to form a rectangular tube configuration having a top end thereof, said carton blank including a substrate layer defining an external side and an internal side of the carton which is provided with a spout opening die-cut through said substrate layer at said top end of said carton blank, and a thermoplastic extrusion layer applied on the external side of said substrate layer and covering said spout opening of said substrate layer;

a spout fitment made of thermoplastic material having an annular flange portion defining a planar rear surface area and a pour hole therethrough which is positioned in registration with said spout opening in said substrate of said carton blank; and an adhesive layer made of hot-melt adhesive applied over the rear surface area of said flange portion of said spout fitment, wherein said thermoplastic material of said flange portion of said spout fitment and said adhesive layer of hot-melt adhesive applied over the rear surface area of said flange portion are heat-sealed to said thermoplastic extrusion layer on the external side of said substrate layer, so as to form a secure fitment seal through heat-sealing only on the external side of said substrate layer.

* * * * *